United States Patent
Yamasaki et al.

(10) Patent No.: US 9,562,147 B2
(45) Date of Patent: Feb. 7, 2017

(54) TRANSPARENT POLYAMIDE RESIN COMPOSITION AND CROSSLINKED TRANSPARENT POLYAMIDE RESIN MOLDED BODY

(71) Applicants: SUMITOMO ELECTRIC INDUSTRIES, LTD., Osaka-shi, Osaka (JP); SUMITOMO ELECTRIC FINE POLYMER, INC., Sennan-gun, Osaka (JP)

(72) Inventors: Satoshi Yamasaki, Osaka (JP); Shouhei Okabe, Sennan-gun (JP); Makoto Nakabayashi, Sennan-gun (JP)

(73) Assignees: SUMITOMO ELECTRIC INDUSTRIES, LTD., Osaka-shi, Osaka (JP); SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 0 days.

(21) Appl. No.: 14/784,825

(22) PCT Filed: Oct. 28, 2014

(86) PCT No.: PCT/JP2014/078550
§ 371 (c)(1),
(2) Date: Oct. 15, 2015

(87) PCT Pub. No.: WO2015/129100
PCT Pub. Date: Sep. 3, 2015

(65) Prior Publication Data
US 2016/0083559 A1    Mar. 24, 2016

(30) Foreign Application Priority Data
Feb. 25, 2014    (JP) ................. 2014-034013

(51) Int. Cl.
C08G 69/26 (2006.01)
C08L 77/00 (2006.01)
C08K 5/3492 (2006.01)
C08J 5/00 (2006.01)
C08L 77/06 (2006.01)

(52) U.S. Cl.
CPC .............. $C08K\ 5/34924$ (2013.01); $C08J\ 5/00$ (2013.01); $C08L\ 77/06$ (2013.01); $C08J\ 2377/06$ (2013.01)

(58) Field of Classification Search
None
See application file for complete search history.

(56) References Cited

U.S. PATENT DOCUMENTS

2013/0188365 A1*  7/2013  Nakabayashi ...  B29D 11/00346
                                              362/335

FOREIGN PATENT DOCUMENTS

| | | |
|---|---|---|
| CN | 101415751 A | 4/2009 |
| JP | 2010-243659 A | 10/2010 |
| JP | 2010-260889 A | 11/2010 |
| JP | 4681073 B2 | 5/2011 |
| JP | 2012-229293 A | 11/2012 |
| JP | 2013-028661 A | 2/2013 |
| JP | 2013-108097 A | 6/2013 |
| WO | WO-2009/084690 A1 | 7/2009 |
| WO | WO-2010/084845 A1 | 7/2010 |
| WO | WO-2011/024610 A1 | 3/2011 |
| WO | WO-2013/005632 A1 | 1/2013 |
| WO | WO-2013/038926 A1 | 3/2013 |

* cited by examiner

*Primary Examiner* — Ana Woodward
(74) *Attorney, Agent, or Firm* — Drinker Biddle & Reath LLP

(57) ABSTRACT

A transparent polyamide resin composition includes a transparent polyamide resin which is a copolymer of an alicyclic diamine and a dicarboxylic acid and which has a refractive index of 1.500 to 1.550, and a transparent crosslinking auxiliary having a refractive index of 1.500 to 1.550, in which the amount of the crosslinking auxiliary added is 13 to 26 parts by mass relative to 100 parts by mass of the transparent polyamide resin, and the crosslinking auxiliary is dispersed, as phases with a diameter of 350 nm or less, in the transparent polyamide resin. A crosslinked transparent polyamide resin molded body is obtained by molding the transparent polyamide resin composition and crosslinking the transparent polyamide resin.

7 Claims, No Drawings

TRANSPARENT POLYAMIDE RESIN COMPOSITION AND CROSSLINKED TRANSPARENT POLYAMIDE RESIN MOLDED BODY

TECHNICAL FIELD

The present invention relates to a transparent polyamide resin composition used as a material for producing optical lenses made of a resin, or the like, and a crosslinked transparent polyamide resin molded body which is obtained from the transparent polyamide resin composition and used as a fine optical lens made of a resin, or the like.

BACKGROUND ART

Optical lenses made of a transparent resin are lightweight, unlikely to be broken, and readily molded, compared with optical lenses composed of inorganic glass. When the transparent resin is a transparent polyamide resin, rigidity and heat resistance during reflow soldering can be imparted by crosslinking. Therefore, optical lenses composed of a transparent polyamide resin which has been crosslinked by electron beam irradiation or the like are widely used for various optical instruments.

For example, Patent Literature 1 discloses an optical lens, which includes a molded body composed of a molding material (resin composition) containing a transparent polyamide and a stabilizer, which is obtained by crosslinking the transparent polyamide by irradiation, which has a total light transmission of 60% or more when the molded body has a thickness of 2 mm, and which has satisfactory rigidity in the range of room temperature to a high temperature and high heat resistance during reflow soldering, in which the problem of thermal deformation is unlikely to occur even when the temperature of the usage environment increases.

Patent Literature 2 discloses a transparent polyamide resin molded body which is composed of a resin composition containing a transparent polyamide resin, a crosslinking auxiliary, and an antioxidant, which is obtained by crosslinking the transparent polyamide resin, and which has a storage elastic modulus of 10 MPa or more at 270° C., and an optical lens including the resin molded body.

CITATION LIST

Patent Literature

PTL 1: Japanese Patent No. 4681073
PTL 2: Japanese Unexamined Patent Application Publication No. 2012-229293

SUMMARY OF INVENTION

Technical Problem

In such optical lens molded bodies made of a resin, it is desired to suppress deformation due to heating (thermal deformation). In recent years, with the miniaturization and the complexity of shapes of optical lens molded bodies, it has been increasingly required to suppress minute changes in shape, for example, warpage and the like. In particular, in the case of thin molded bodies, since the amount of deformation due to heating is large during reflow soldering or the like, it is more strongly required to suppress the deformation. Existing resin molded bodies, such as the ones described above, are unlikely to meet these requirements.

The reason for thermal deformation, i.e., deformation of a molded body due to heating, is believed to be the residual stress remaining within the molded body during molding. In particular, in the case where the molding temperature is low, the viscosity of the molding material (resin composition) is high, necessitating resin filling under an applied injection pressure, and residual stress is likely to remain in the molded body. Consequently, it is difficult to obtain a molded body whose thermal deformation is suppressed so as to satisfy the recent requirements. However, if the viscosity is decreased by increasing the temperature of the molding material (resin composition), although the injection pressure can be decreased, there is a concern that coloring of the resin and decomposition/volatilization of additives may occur.

Japanese Unexamined Patent Application Publication No. 2010-260889 describes use of a molding material to which glass fibers having an anisotropic cross section are added in order to improve warpage deformation or the like of a molded article composed of a polyamide resin. However, if glass fibers having an anisotropic cross section are added, it is not possible to maintain the transparency of the molded body. Therefore, this method cannot be applied to the production of optical lens molded bodies.

Furthermore, Japanese Unexamined Patent Application Publication No. 2013-108097 discloses a method in which a polysilane compound is used as a modifying agent in order to improve melt moldability of a polyamide resin. The flowability of the polyamide resin molding material is considered to be improved by the addition of a modifying agent. However, this method tends to decrease the transparency of the transparent polyamide resin, and therefore, is difficult to apply to optical lens molded bodies. Accordingly, there has been a demand for development of a transparent polyamide resin molded body whose thermal deformation is suppressed so as to satisfy the recent requirements and which has high transparency, and a molding material (resin composition) capable of producing such a resin molded body.

It is an object of the present invention to provide a molding material (resin composition) capable of producing a transparent polyamide resin molded body whose thermal deformation is suppressed so as to satisfy the recent requirements and which has high transparency.

It is another object of the present invention to provide a crosslinked transparent polyamide resin molded body whose thermal deformation is suppressed so as to satisfy the recent requirements, which has high transparency, and which has a high storage elastic modulus at high temperatures (about 270° C.).

Solution to Problem

The present inventor has performed thorough studies in order to solve the problems described above. As a result, it has been found that the objects described above can be achieved by a resin composition including a specific transparent polyamide resin and a transparent crosslinking auxiliary having a refractive index close to that of the transparent polyamide resin, in which the amount of the crosslinking auxiliary added is within a specific range, and the crosslinking auxiliary is dispersed, as phases with a diameter of 350 nm or less, in the transparent polyamide resin, and by molding the resin composition and crosslinking the transparent polyamide resin. Thus, the present invention has been achieved.

According to a first embodiment of the present invention, there is provided a transparent polyamide resin composition including a transparent polyamide resin which is a copolymer of an alicyclic diamine and a dicarboxylic acid and which has a refractive index of 1.500 to 1.550, and a transparent crosslinking auxiliary having a refractive index of 1.500 to 1.550, in which the amount of the crosslinking auxiliary added is 13 to 26 parts by mass relative to 100 parts by mass of the transparent polyamide resin,and the crosslinking auxiliary is dispersed, as phases with a diameter of 350 nm or less, in the transparent polyamide resin.

According to a second embodiment of the present invention, there is provided a crosslinked transparent polyamide resin molded body obtained by molding a transparent polyamide resin composition including a transparent polyamide resin which is a copolymer of an alicyclic diamine and a dicarboxylic acid and which has a refractive index of 1.500 to 1.550, and a transparent crosslinking auxiliary having a refractive index of 1.500 to 1.550, in which the amount of the crosslinking auxiliary added is 13 to 26 parts by mass relative to 100 parts by mass of the transparent polyamide resin, and the crosslinking auxiliary is dispersed, as phases with a diameter of 350 nm or less, in the transparent polyamide resin, and by crosslinking the transparent polyamide resin.

Advantageous Effects of Invention

By using the transparent polyamide resin composition according to the first embodiment as a molding material, it is possible to produce a transparent polyamide resin molded body whose thermal deformation is suppressed so as to satisfy the recent requirements and which has high transparency.

The crosslinked transparent polyamide resin molded body according to the second embodiment is a molded body whose thermal deformation is suppressed so as to satisfy the recent requirements, which has high transparency, which has a high rigidity (storage elastic modulus) at high temperatures, and which is suitably used as a fine optical lens or the like.

DESCRIPTION OF EMBODIMENTS

Embodiments and examples will be described below. Note that the present invention is not limited to the contents described below, and it is intended that the scope of the present invention is determined by appended claims, and includes all variations of the equivalent meanings and ranges to the claims.

According to a first embodiment of the present invention, a transparent polyamide resin composition includes a transparent polyamide resin which is a copolymer of an alicyclic diamine and a dicarboxylic acid and which has a refractive index of 1.500 to 1.550, and a transparent crosslinking auxiliary having a refractive index of 1.500 to 1.550, in which the amount of the crosslinking auxiliary added is 13 to 26 parts by mass relative to 100 parts by mass of the transparent polyamide resin, and the crosslinking auxiliary is dispersed, as phases with a diameter of 350 nm or less, in the transparent polyamide resin.

A transparent polyamide resin composition according to this embodiment includes a transparent polyamide resin and a transparent crosslinking auxiliary, characterized in that the transparent polyamide resin is a copolymer of an alicyclic diamine and a dicarboxylic acid, the refractive index of the transparent polyamide resin is close to the refractive index of the crosslinking auxiliary, each being in the range of 1.500 to 1.550, the amount of the crosslinking auxiliary added is 13 to 26 parts by mass relative to 100 parts by mass of the transparent polyamide resin, and the crosslinking auxiliary is dispersed, as phases with a diameter of 350 nm or less, in the transparent polyamide resin.

By using the resin composition having the characteristics described above as a molding material, it is possible to produce a crosslinked transparent polyamide resin molded body in which deformation, such as warpage, due to heating is suppressed so as to satisfy the recent requirements even when the molded body has a fine shape or is in the form of a thin film, and which has high transparency that allows use as an optical lens or the like.

The transparent polyamide resin has a refractive index of 1.500 to 1.550. The crosslinking auxiliary to be mixed with the transparent polyamide resin is also transparent and has a refractive index close to that of the transparent polyamide resin, in the range of 1.500 to 1.550. Consequently, in the resin composition and the crosslinked resin molded body obtained from the resin composition, the decrease in transparency due to addition of the crosslinking auxiliary is small, and high transparency can be obtained unless the amount of the crosslinking auxiliary added is excessively large. In the case where a crosslinking auxiliary having a refractive index that is outside the range of 1.500 to 1.550, i.e., a refractive index widely different from the refractive index of the transparent polyamide resin, is used, the transmissivity of a molded body obtained from the resin composition decreases, and high transparency cannot be obtained. Furthermore, in this case, the thermal deformation of the obtained molded body tends to increase.

By adding the crosslinking auxiliary, the flowability of the resin composition can be improved. When the flowability is improved, the residual stress during injection molding can be decreased, and the thermal deformation amount of the molded body can be decreased. Specifically, when the amount of the crosslinking auxiliary added is less than 13 parts by mass relative to 100 parts by mass of the transparent polyamide resin, the thermal deformation amount of the resulting molded body increases, and it is not possible to obtain a crosslinked transparent polyamide resin molded body that satisfies the recent requirements. On the other hand, when the amount exceeds 26 parts by mass, because of the excessively large amount added, the transmissivity of the molded body decreases, and transparency tends to decrease.

The crosslinking auxiliary is dispersed, as droplet fine particles (phases) with a diameter of 350 nm or less, in the transparent polyamide resin. By further decreasing the diameter of the droplets (phases) of the crosslinking auxiliary dispersed in the transparent polyamide resin, the viscosity of the molding material (resin composition) can be further decreased, and the flowability thereof can be further improved. As a result, the residual stress during molding can be further decreased, and the thermal deformation amount of the molded body can be further decreased. Furthermore, when the diameter of the crosslinking auxiliary phases (droplets) in the resin composition is 350 nm or less, the cured phases of the crosslinking auxiliary dispersed in the molded body after the resin has been crosslinked by electron beam irradiation or the like also have a diameter of 350 nrn or less. Transparency is maintained after crosslinking, and the transparency of the crosslinked molded body is improved. Although the refractive index of the crosslinking auxiliary is at the same level as that of the transparent polyamide resin, when actually used, there is a possibility that a small difference in refractive index will occur because of self-polymerization of crosslinking auxiliary droplets.

However, since the wavelength of visible light is 380 to 780 nm, as long as the diameter of the crosslinking auxiliary phases (droplets) is 350 nm or less, even when a small difference in refractive index occurs, transparency is not impaired. Because of the inclusion of the crosslinking auxiliary, the diameter of the dispersion phases of the crosslinking auxiliary is of course larger than zero.

Furthermore, by dispersing the crosslinking auxiliary, as droplet fine particles (phases) with a diameter of 350 nm or less, in the transparent polyamide resin, crosslinking efficiency increases when the transparent polyamide resin is crosslinked after molding. As a result, it is possible to obtain an advantage that the glass transition point of the resin increases. Since the glass transition point increases, when heated during reflow soldering with lead-free solder (treatment at 270° C. or higher in a reflow furnace), the time in which the temperature exceeds the glass transition point, i.e., the time in which the molded body is subjected to deformation, is shortened. Therefore, the deformation amount during heating can be suppressed to a very low level. Furthermore, since the glass transition point increases, the storage elastic modulus at the glass transition point or higher increases. Therefore, the deformation amount during heating can be suppressed to a very low level.

By dispersing the crosslinking auxiliary as droplet fine particles (phases) with a diameter of 350 nm or less, it is also possible to obtain an advantage that the storage elastic modulus of the crosslinked molded body can be improved. By molding a resin composition which includes 13 to 26 parts by mass of a crosslinking auxiliary relative to 100 parts by mass of a transparent polyamide resin, in which the crosslinking auxiliary is dispersed as droplet fine particles (phases) with a diameter of 350 nm or less, and crosslinking the resin, it is possible to obtain a storage elastic modulus of 15 MPa or more at 270° C.

In the case where phases with a diameter of more than 350 nm are included, the thermal deformation amount of the resulting molded body increases, and it is not possible to obtain a crosslinked transparent polyamide resin molded body that satisfies the recent requirements. Furthermore, the transparency of the molded body tends to decrease.

The diameter of the crosslinking auxiliary phases or the cured phases of the crosslinking auxiliary is a value measured by STEM or AFM, which will be described in examples. In these methods, when the resin is in the uncrosslinked state, the crosslinking auxiliary flows out of the observation cross section and is observed as pores. After crosslinking, cured phases of the crosslinking auxiliary can be determined on the basis of the contrast in the observation cross section. Regarding the presence or absence of phases (liquid phases or cured phases) with a diameter of more than 350 nm, fields of view of 5 µm×5 µm were randomly selected by AFM or STEM, and observation was performed five times. In the case where one or more phases with a diameter of more than 350 nm were observed, it was determined that "phases with a diameter of more than 350 nm were included (present)". In the case where no phases with a diameter of more than 350 nm were observed, it was determined that "phases with a diameter of 350 nm or less were dispersed (absent)".

The transparent polyamide resin refers to a copolymer of a diamine and a dicarboxylic acid, the copolymer being transparent. Examples of the transparent resin that can be used for optical lenses and the like include polymethyl methacrylate, polycarbonate, and cyclic polyolefins. However, a transparent polyamide resin is selected because rigidity and heat resistance during reflow soldering can be imparted by crosslinking. As the diamine, an alicyclic diamine is used. By using the alicyclic diamine, it is possible to obtain a transparent polyamide resin having a refractive index in the range of 1.500 to 1.550.

As the alicyclic diamine, 4,4'-methylenebis(2-methylcyclohexylamine) or 4,4'-methylenebis(cyclohexylamine) is preferable. These compounds have bulky molecular chains and hinder crystallization of the resin, and therefore, the resin is likely to become amorphous and transparent. Accordingly, as a preferred embodiment, there is provided a transparent polyamide resin composition according to the first embodiment, in which the alicyclic diamine is an alicyclic diamine selected from the group consisting of 4,4'-methylenebis(2-methylcyclohexylamine) and 4,4'-methylenebis(cyclohexylamine). One alicyclic diamine may be used, or two or more alicyclic diamines may be used as a mixture.

As the dicarboxylic acid constituting the transparent polyamide resin,dec anediacid, undecanediacid, dodecanediacid, and the like are preferable because of their long carbon chain and ease of crosslinking. In particular, dodecanediacid is preferable. Accordingly, as a preferred embodiment, there is provided a transparent polyamide resin composition according to the first embodiment, in which the dicarboxylic acid is dodecanediacid.

The crosslinking auxiliary is a liquid at normal temperature and can be dispersed in the transparent polyamide resin. As such a crosslinking auxiliary, a transparent crosslinking auxiliary having a refractive index in the range of 1.500 to 1.550 is used, and specific examples thereof include isocyanurates, such as triallyl isocyanurate (TAIC) and diallyl monoglycidyl isocyanurate (DA-MGIC). In particular, a crosslinking auxiliary containing TAIC as a basic structure is preferable because it is a liquid at normal temperature and transparent, has a refractive index close to that of the transparent polyamide resin and a molecular polarity close to that of the transparent polyamide resin, and thus is likely to be dispersed in the transparent polyamide resin. Accordingly, as a preferred embodiment, there is provided a transparent polyamide resin composition according to the first embodiment, in which the crosslinking auxiliary contains TAIC as a basic structure.

Preferably, the transparent polyamide resin composition according to the first embodiment has high flowability and can be injection-molded at a low injection pressure even at low temperatures at which coloring, volatilization, and the like of the resin do not occur. In this case, residual stress during molding can be decreased, and the thermal deformation amount of the molded body can be decreased. Accordingly, as a preferred embodiment, there is provided a transparent polyamide resin composition according to the first embodiment, in which the melt flow rate is 35 g/10 min or more at 250° C. under a load of 5 kg. This transparent polyamide resin composition can be obtained by using TAIC as the crosslinking auxiliary, setting the amount thereof added to be 13 to 26 parts by mass relative to 100 parts by mass of the transparent polyamide resin, and dispersing the crosslinking auxiliary as phases with a diameter of 350 nm or less. More preferably, the transparent polyamide resin composition has a melt flow rate of 45 g/10 min or more at 250° C. under a load of 5 kg.

According to a second embodiment of the present invention, a crosslinked transparent polyamide resin molded body is obtained by molding a transparent polyamide resin composition including a transparent polyamide resin which is a copolymer of an alicyclic diamine and a dicarboxylic acid and which has a refractive index of 1.500 to 1.550, and a transparent crosslinking auxiliary having a refractive index of 1.500 to 1.550, in which the amount of the crosslinking auxiliary added is 13 to 26 parts by mass relative to 100 parts by mass of the transparent polyamide resin, and the crosslinking auxiliary is dispersed, as phases with a diameter of 350 nm or less, in the transparent polyamide resin, and by crosslinking the transparent polyamide resin.

The crosslinked transparent polyamide resin molded body according to the second embodiment is obtained by molding the resin composition according to the first embodiment and crosslinking the transparent polyamide resin. The molding and crosslinking can be performed under the same conditions and methods as those for producing existing crosslinked transparent polyamide resin molded bodies.

The crosslinking can be performed by chemical crosslinking or the like. However, because of ease of control and the like, crosslinking by irradiation with ionizing radiation is preferably employed. Examples of ionizing radiation include particle beams such as electron beams, and electromagnetic waves such as gamma rays. From the viewpoint of productivity, costs of apparatus, ease of control, and the like, electron beams are preferable.

In the crosslinked transparent polyamide resin molded body according to the second embodiment, thermal deformation, such as warpage, is suppressed, and the molded body has excellent properties, such as high transparency, a high glass transition point (Tg), and a high storage elastic modulus at high temperatures of about 270° C. in a reflow soldering furnace, and thus can be suitably used as an optical lens or the like. Furthermore, as the glass transition point increases, thermal deformation can be further suppressed. Therefore, the glass transition point is preferably higher, and specifically, 175° C. or higher. Furthermore, an uncrosslinked transparent polyamide molded body obtained from the resin composition according to the first embodiment has a glass transition point of about 150° C. to 160° C., and the glass transition point can be increased to 175° C. or higher by crosslinking.

In the crosslinked transparent polyamide resin molded body according to the second embodiment, particularly preferably, the glass transition point is 175° C. or higher, the transmissivity of light with a wavelength of 850 nm is 90% or more when the molded body has a thickness of 0.5 mm, the storage elastic modulus is 15 MPa or more at 270° C., and the difference in thickness before and after heat treatment (amount of change in shape) is 50 μm or less when an operation is performed in which the molded body is shaped into a sheet of 50 mm×50 mm×0.5 mm, the sheet is placed into a chamber set at 180° C., the temperature is maintained for 90 seconds, then the set temperature of the chamber is raised from 180° C. to 270° C. in 30 seconds, the temperature is maintained at 270° C. for 30 seconds, and the temperature is lowered from 270° C. to 180° C. in 90 seconds. Accordingly, this crosslinked transparent polyamide resin molded body is provided as an embodiment that is preferable to the second embodiment. The crosslinked transparent polyamide resin molded body according to this preferable embodiment can be produced by molding the resin composition according to the first embodiment and then crosslinking the resin. The amount of change in shape means a difference in thickness (μm) of a sample before and after heat treatment when an operation is performed in which a sheet-shaped sample of 50 mm×50 mm×0.5 mm is placed into a chamber set at 180° C., the temperature is maintained for 90 seconds, then the set temperature of the chamber is raised from 180° C. to 270° C. in 30 seconds, the temperature is maintained at 270° C. for 30 seconds, and the temperature is lowered from 270° C. to 180° C. in 90 seconds. That is, the amount of change in shape is (thickness after heat treatment—thickness before heat treatment) and corresponds to a change in height due to warpage of the sheet.

EXAMPLES (Materials Used)
[Transparent Polyamide Resin]
TR90: manufactured by EMS-Chemie Ltd.
(glass transition point Tg 155° C., MI=12, refractive index 1.51 to 1.52)
TROGAMID CX7323: manufactured by Daicel-Evonik Ltd.
(glass transition point Tg 155° C., MI=10, refractive index 1.51 to 1.52)
Rilsan Clear G850: manufactured by Arkema
(glass transition point Tg 147° C., MI=14, refractive index 1.50 to 1.52)
[Crosslinking Auxiliary]
A-TAIC (manufactured by Nippon Kasei Chemical Co., Ltd., refractive index 1.51)
DA-MGIC (manufactured by Shikoku Chemicals Corporation, refractive index 1.52)
A-TMPT (trimethylolpropane triacrylate: manufactured by Shin-Nakamura Chemical Co., Ltd., refractive index 1.48)
TMPT (trimethylolpropane trimethacrylate: manufactured by Shin-Nakamura Chemical Co., Ltd.,r efractive index 1.47)

(Compound Evaluation)

The materials described above were mixed in accordance with the compositions shown in Tables I to III, using a twin screw extruder by mixing, under high-flow conditions at a mixing temperature of 250° C. or higher, with the screw torque being controlled to 30% or less of the limit value during mixing, and then drying was performed at 80° C. for 24 hours, thereby obtaining compounds. Usually, from the viewpoint of improving productivity, it is preferable to mix materials at a temperature that is 10° C. to 20° C. higher than the glass transition point of the transparent polyamide resin under the condition in which the screw torque is set at the limit value during mixing. However, by employing the mixing method described above, it is possible to satisfactorily disperse the crosslinking auxiliary such that the diameter of droplet phases is 350 nm or less. In Comparative Example 3, mixing was performed under the usual mixing conditions (set temperature of apparatus 170° C. to 200° C., screw torque 70%). As a result, as shown in Table III, dispersion phases of the crosslinking auxiliary with a diameter of more than 350 nm were present. After the compounds were kept in a low humidity storage cabinet (ambient humidity about 50%),t he melt flow index (MI), the ignition loss at 350° C., and the size of crosslinking auxiliary phases (presence or absence of droplets with a diameter of more than 350 nm) were measured by the methods described below. The results thereof are shown in Tables I to III.

<Measurement Methods>
[Melt Flow Index (MI)]
The result measured using a melt indexer manufactured by Toyo Seiki Seisaku-sho, Ltd. under the conditions of heating at 250° C. and at a load of 5 kg. Units: g/10 min
[350° C. Ignition Loss]
Using a TGA-50 manufactured by Shimadzu Corporation, the weight at 30° C. (30° C. weight) and the weight at 350° C. (350° C. weight) were measured, and the value calculated from the formula: [(30° C. weight−350° C. weight)/30° C. weight]×100 was defined as the 350° C. ignition loss (%). This corresponds to the volatile content of the crosslinking auxiliary.

[Size of Crosslinking Auxiliary Phases]

The resulting compounds were subjected to cross-sectioning with a cryo-microtome, and by performing observation with a scanning probe microscope (atomic force microscope: AFM) under the conditions described below, the presence or absence of droplets (phases) with a diameter of more than 350 nm was checked.

Apparatus: Dimension Icon (manufactured by Bruker AXS)

Cantilever: NCHV-10V

Fields of view of 5 μm×5 μm were randomly selected, and observation was performed five times. The case where one or more phases with a diameter of more than 350 nm were observed was evaluated as "present". The case where no phases with a diameter of more than 350 nm were observed was evaluated as "absent".

(Injection Molding)

The compounds which had been dried at 80° C. for 24 hours were subjected to injection molding, using an injection molding machine (SE-185, manufactured by Sumitomo Heavy Industries, Ltd.), under the conditions at a cylinder temperature of 260° C., a mold temperature of 30° C., an injection speed of 200 mm/s, and a dwell pressure of 1,000 kgf/cm². Thereby, square plates with dimensions of 50 mm×50 mm ×0.5 mm (thickness) were produced as evaluation samples. The injection pressure during injection molding is shown in Tables I to III. The injection pressure is the average value calculated from the injection pressure of each sample when 20 evaluation samples are produced (units: kgf/cm²).

(Irradiation, Evaluation)

The resulting evaluation samples were irradiated with electron beams at a dose of 300 kGy or 600 kGy, and crosslinked resin molded bodies were obtained. Regarding the resulting crosslinked resin molded bodies, the amount of warpage after heat treatment, the storage elastic modulus at 270° C.,t he transmissivity of light with a wavelength of 850 nm, and the glass transition point were measured by the methods described below. The results thereof are shown in Tables I to III. Furthermore, when the dose was 600 kGy, the size of crosslinking auxiliary cured phases (presence or absence of cured phases with a diameter of more than 350 nm) was measured by the method described below. The results thereof are also shown in Tables I to III.

<Measurement Methods>

[Amount of Warpage (Amount of Change in Shape) After Heat Teatment]

A sample is placed into a chamber set at 180° C. and the temperature is maintained for 90 seconds. Then, the set temperature of the chamber is raised from 180° C. to 270° C. in 30 seconds, and the temperature is maintained at 270° C. for 30 seconds. Furthermore, the temperature is lowered from 270° C. to 180° C. in 90 seconds, and the sample is taken out of the chamber. The thickness of the sample is measured before and after the heat treatment, and (thickness after heat treatment - thickness before heat treatment) is defined as the amount of warpage (amount of change in shape) after heat treatment.

[Storage Elastic Modulus at 270° C.] and [Glass Transition Point]

Using a DVA-200 manufactured by IT Keisokuseigyo K.K., measurement was performed at a rate of temperature increase of 10° C./min, and the storage elastic modulus at 270° C. was confirmed. Furthermore, the peak temperature of tanδ was defined as the glass transition point.

[Transmissivity of Light with a Wavelength of 850 nm]

Using a UV2450 manufactured by Shimadzu Corporation, the light transmittance at 850 nm was measured.

[Size of Crosslinking Auxiliary Cured Phases]

The sample after irradiation was subjected to cross-sectioning with a cryo-microtome, and by performing STEM (Scanning Transmission Electron Microscope) observation using a low acceleration SEM (Ultra55) under the conditions described below, the presence or absence of cured phases with a diameter of more than 350 nm was checked.

Accelerating Voltage: 30 kV

CP (Cross-section Polisher) cross section→accelerating voltage 1 kV, tilt: 0°, no vapor deposition Fields of view of 5 μm×5 μm were randomly selected, and observation was performed five times. The case where one or more phases with a diameter of more than 350 nm were observed was evaluated as "present". The case where no phases with a diameter of more than 350 nm were observed was evaluated as "absent".

TABLE I

| | Example 1 | Example 2 | Example 3 | Example 4 | Example 5 | Example 6 |
|---|---|---|---|---|---|---|
| [Material composition] | | | | | | |
| TR90 | 100 | 100 | 100 | 100 | 100 | 100 |
| TROGAMID CX7323 | — | — | — | — | — | — |
| Rilsan Clear G850 | — | — | — | — | — | — |
| TAIC | 13 | 16 | 20 | 22 | 24 | 26 |
| DA-MGIC | — | — | — | — | — | — |
| A-TMPT | — | — | — | — | — | — |
| TMPT | — | — | — | — | — | — |
| [Compound evaluation] | | | | | | |
| MI (g/10 min) | 35 | 43 | 56 | 71 | 79 | 86 |
| 350° C. ignition loss % | 10.1 | 11.3 | 15.2 | 17.1 | 14.6 | 18.1 |
| Presence or absence of phase size of more than 350 nm | Absent | Absent | Absent | Absent | Absent | Absent |
| Injection pressure | 1810 | 1730 | 1630 | 1580 | 1500 | 1360 |
| [Dose 300 kGy] | | | | | | |
| Amount of warpage after heat treatment (μm) | 48 | 33 | 17 | 15 | 12 | 11 |
| Storage elastic modulus 270° C. (MPa) | 15.2 | 16.7 | 19.5 | 20.8 | 21.2 | 21.7 |
| Transmissivity 850 nm (%) | 91.0 | 91.9 | 93.7 | 93.5 | 91.1 | 90.9 |
| Glass transition point ° C. | 176.0 | 179.8 | 181.8 | 187.7 | 185.9 | 187.9 |
| [Dose 600 kGy] | | | | | | |
| Amount of warpage after heat treatment (μm) | 47 | 31 | 14 | 12 | 11 | 11 |
| Storage elastic modulus 270° C. (MPa) | 15.8 | 17.5 | 21.8 | 25.9 | 28.2 | 29.3 |

TABLE I-continued

|  | Example 1 | Example 2 | Example 3 | Example 4 | Example 5 | Example 6 |
|---|---|---|---|---|---|---|
| Transmissivity 850 nm % | 90.8 | 90.5 | 91.2 | 91.3 | 90.6 | 90.2 |
| Glass transition point ° C. | 179.7 | 186.0 | 191.7 | 193.8 | 195.6 | 193.7 |
| Presence or absence of phase size of more than 350 nm | Absent | Absent | Absent | Absent | Absent | Absent |

Compositions are each expressed in terms of parts by weight.

TABLE II

|  | Example 7 | Example 8 | Example 9 | Example 10 |
|---|---|---|---|---|
| [Material composition] | | | | |
| TR90 | 100 | — | — | — |
| TROGAMID CX7323 | — | 100 | 100 | — |
| Rilsan Clear G850 | — | — | — | 100 |
| TAIC | — | 16 | 22 | 22 |
| DA-MGIC | 20 | — | — | — |
| A-TMPT | — | — | — | — |
| TMPT | — | — | — | — |
| [Compound evaluation] | | | | |
| MI (g/10 min) | 47 | 37 | 60 | 75 |
| 350° C. ignition loss % | 14.9 | 10.7 | 16.7 | 17.2 |
| Presence or absence of phase size of more than 350 nm | Absent | Absent | Absent | Absent |
| Injection pressure [Dose 300 kGy] | 1690 | 1770 | 1600 | 1510 |
| Amount of warpage after heat treatment (μm) | 21 | 37 | 18 | 13 |
| Storage elastic modulus 270° C. (MPa) | 18.5 | 16.1 | 19.8 | 20.9 |
| Transmissivity 850 nm (%) | 91.5 | 91.4 | 93.2 | 93.4 |
| Glass transition point ° C. | 181.5 | 178.5 | 185.3 | 188.1 |
| [Dose 600 kGy] | | | | |
| Amount of warpage after heat treatment (μm) | 19 | 31 | 14 | 11 |
| Storage elastic modulus 270° C. (MPa) | 20.9 | 17.3 | 24.1 | 26.2 |
| Transmissivity 850 nm % | 90.8 | 90.8 | 90.2 | 91.1 |
| Glass transition point ° C. | 190.9 | 184.5 | 191.6 | 194.3 |
| Presence or absence of phase size of more than 350 nm | Absent | Absent | Absent | Absent |

Compositions are each expressed in terms of parts by weight.

TABLE III

|  | Comparative Example 1 | Comparative Example 2 | Comparative Example 3 | Comparative Example 4 | Comparative Example 5 | Comparative Example 6 |
|---|---|---|---|---|---|---|
| [Material composition] | | | | | | |
| TR90 | 100 | 100 | 100 | 100 | 100 | 100 |
| TROGAMID CX7323 | — | — | — | — | — | — |
| Rilsan Clear G850 | — | — | — | — | — | — |
| TAIC | 4 | 8 | 20 | 27.2 | — | — |
| DA-MGIC | — | — | — | — | — | — |
| A-TMPT | — | — | — | — | 20 | — |
| TMPT | — | — | — | — | — | 20 |
| [Compound evaluation] | | | | | | |
| MI (g/10 min) | 17 | 26 | 32 | 95 | 18 | 22 |
| 350° C. ignition loss % | 4.3 | 6.5 | 15.1 | 19.7 | 15.2 | 14.8 |
| Presence or absence of phase size of more than 350 nm | Absent | Absent | Present | Absent | Present | Present |
| Injection pressure [Dose 300 kGy] | >2000 | >2000 | 1950 | 1210 | >2000 | >2000 |
| Amount of warpage after heat treatment (μm) | 1005 | 255 | 95 | 12 | 451 | 352 |
| Storage elastic modulus 270° C. (MPa) | 6.1 | 10.2 | 14.4 | 22.7 | 2.5 | 3.3 |
| Transmissivity 850 nm (%) | 93.1 | 92.7 | 88.6 | 85.2 | 75.4 | 73.5 |
| Glass transition point ° C. | 165.7 | 171.7 | 174.3 | 187.6 | 161.8 | 162.2 |

TABLE III-continued

|  | Comparative Example 1 | Comparative Example 2 | Comparative Example 3 | Comparative Example 4 | Comparative Example 5 | Comparative Example 6 |
|---|---|---|---|---|---|---|
| [Dose 600 kGy] | | | | | | |
| Amount of warpage after heat treatment (μm) | 845 | 161 | 82 | 12 | 436 | 335 |
| Storage elastic modulus 270° C. (MPa) | 7.3 | 10.5 | 14.9 | 30.3 | 2.8 | 3.1 |
| Transmissivity 850 nm % | 91.6 | 91.2 | 84.2 | 81.3 | 70.2 | 67.5 |
| Glass transition point ° C. | 165.9 | 173.7 | 180.8 | 195.9 | 162.8 | 163.1 |
| Presence or absence of phase size of more than 350 nm | Absent | Absent | Present | Absent | Present | Present |

Compositions are each expressed in terms of parts by weight.

The following is evident from the results shown in Tables I to III.

In each of the transparent polyamide resin compositions of Examples 1 to 10, in which a transparent polyamide resin being a copolymer of an alicyclic diamine and a dicarboxylic acid and having a refractive index in the range of 1.500 to 1.550 is used, a crosslinking auxiliary (TRIC or DA-MGIC) having a refractive index in the range of 1.500 to 1.550 is used, the amount of the crosslinking auxiliary added is in the range of 13 to 26 parts by mass relative to 100 parts by mass of the transparent polyamide resin, and no crosslinking auxiliary phases dispersed in the transparent polyamide resin have a diameter of more than 350 nm, the MI (250° C.·5 kg) of the compound is 35 g/10 min or more, indicating excellent flowability, and as a result, the injection pressure is suppressed to a relatively low level. Furthermore, in the crosslinked transparent polyamide resin molded body (shaped into a sheet of 50 mm×50 mm×0.5 mm) obtained by molding each of the transparent polyamide resin compositions and crosslinking the resin by electron beam irradiation, the glass transition point is 175° C. or higher, the transmissivity of light with a wavelength of 850 nm is 90% or more, and excellent transparency is exhibited. Furthermore, the storage elastic modulus at 270° C. is 15 MPa or more, the amount of change in shape due to heat treatment is 50 μm or less, and the thermal deformation is suppressed so as to satisfy the recent requirements. That is, both excellent transparency and suppression of thermal deformation are achieved. Furthermore, no crosslinking auxiliary cured phases with a diameter of more than 350 nm are observed.

On the other hand, in Comparative Examples 1 and 2 in which the amount of the crosslinking auxiliary added is less than 13 parts by mass relative to 100 parts by mass of the transparent polyamide resin and in Comparative Example 3 in which crosslinking auxiliary dispersion phases with a diameter of more than 350 nm are present, the MI (250° C.·5 kg) of the compound of the resin composition is less than 35 g/10 min, and the injection pressure is large. As a result, in the crosslinked transparent polyamide resin molded bodies (shaped into a sheet of 50 mm×50 mm×0.5 mm) obtained from the resin compositions, the amount of change in shape is more than 50 μm, and thermal deformation is not suppressed sufficiently. Furthermore, the glass transition point is lower than 175° C., and the storage elastic modulus at 270° C. is less than 15 MPa. Moreover, in Comparative Example 3 in which crosslinking auxiliary dispersion phases with a diameter of more than 350 nm are present, the transmissivity of light with a wavelength of 850 nm is less than 90%, and transparency is insufficient.

On the other hand, in Comparative Example 4 in which the amount of the crosslinking auxiliary added is more than 26 parts by mass relative to 100 parts by mass of the transparent polyamide resin, the transmissivity of light with a wavelength of 850 nm is less than 90%, and transparency is insufficient.

Furthermore, in Comparative Examples 5 and 6 in which a crosslinking auxiliary (A-TMPT or TMPT) having a refractive index outside the range of 1.500 to 1.550 is used, the transmissivity of light with a wavelength of 850 nm is less than 90%, and satisfactory transparency is not obtained. Moreover, in Comparative Examples 5 and 6, the flowability of the compound is low (the MI (250° C.·5 kg) is lower than 35 g/10 min), the thermal deformation amount of the crosslinked transparent polyamide resin molded body is large, the glass transition point is lower than 175° C., and the storage elastic modulus at 270° C. is low.

INDUSTRIAL APPLICABILITY

The transparent polyamide resin composition according to the first embodiment is used as a molding material for producing a crosslinked transparent polyamide resin molded body which has high transparency and whose thermal deformation is suppressed. The crosslinked transparent polyamide resin molded body according to the second embodiment has high transparency, in which thermal deformation is suppressed, has a high glass transition point and a high storage elastic modulus at high temperatures, for example, during reflow soldering, and is suitably used as an optical lens or the like.

The invention claimed is:
1. A transparent polyamide resin composition comprising:
   a transparent polyamide resin which is a copolymer of an alicyclic diamine and a dicarboxylic acid and which has a refractive index of 1.500 to 1.550; and
   a transparent crosslinking auxiliary having a refractive index of 1.500 to 1.550, wherein the amount of the crosslinking auxiliary added is 13 to 26 parts by mass relative to 100 parts by mass of the transparent polyamide resin, and the crosslinking auxiliary is dispersed, as phases with a diameter of 350 nm or less, in the transparent polyamide resin.

2. The transparent polyamide resin composition according to claim 1, wherein the alicyclic diamine is an alicyclic diamine selected from the group consisting of 4,4'-methylenebis(2-methylcyclohexylamine) and 4,4'-methylenebis(cyclohexylamine).

3. The transparent polyamide resin composition according to claim 1, wherein the dicarboxylic acid is dodecanediacid.

4. The transparent polyamide resin composition according to claim 1, wherein the crosslinking auxiliary contains triallyl isocyanurate as a basic structure.

5. The transparent polyamide resin composition according to claim 1, wherein a melt flow rate is 35 g/10 min or more at 250° C. under a load of 5 kg.

6. A crosslinked transparent polyamide resin molded body obtained by molding a transparent polyamide resin composition including a transparent polyamide resin which is a copolymer of an alicyclic diamine and a dicarboxylic acid and which has a refractive index of 1.500 to 1.550, and a transparent crosslinking auxiliary having a refractive index of 1.500 to 1.550, in which the amount of the crosslinking auxiliary added is 13 to 26 parts by mass relative to 100 parts by mass of the transparent polyamide resin, and the crosslinking auxiliary is dispersed, as phases with a diameter of 350 nm or less, in the transparent polyamide resin, and by crosslinking the transparent polyamide resin.

7. A crosslinked transparent polyamide resin molded body in which the glass transition point is 175° C. or higher, the transmissivity of light with a wavelength of 850 nm is 90% or more when the molded body has a thickness of 0.5 mm, the storage elastic modulus is 15 MPa or more at 270° C., and the difference in thickness before and after heat treatment is 50 μm or less and 11 μm or more when an operation is performed in which the molded body is shaped into a sheet of 50 mm ×50 mm ×0.5 mm, the sheet is placed into a chamber set at 180° C., the temperature is maintained for 90 seconds, then the set temperature of the chamber is raised from 180° C. to 270° C. in 30 seconds, the temperature is maintained at 270° C. for 30 seconds, and the temperature is lowered from 270° C. to 180° C. in 90 seconds.

* * * * *